Nov. 26, 1968  N. E. WELLS  3,412,624
GEARBOX
Filed Aug. 9, 1966  2 Sheets-Sheet 1

NOVELL E. WELLS
INVENTOR

BY
BUCKHORN, BLORE, KLARQUIST & SPARKMAN
ATTORNEYS

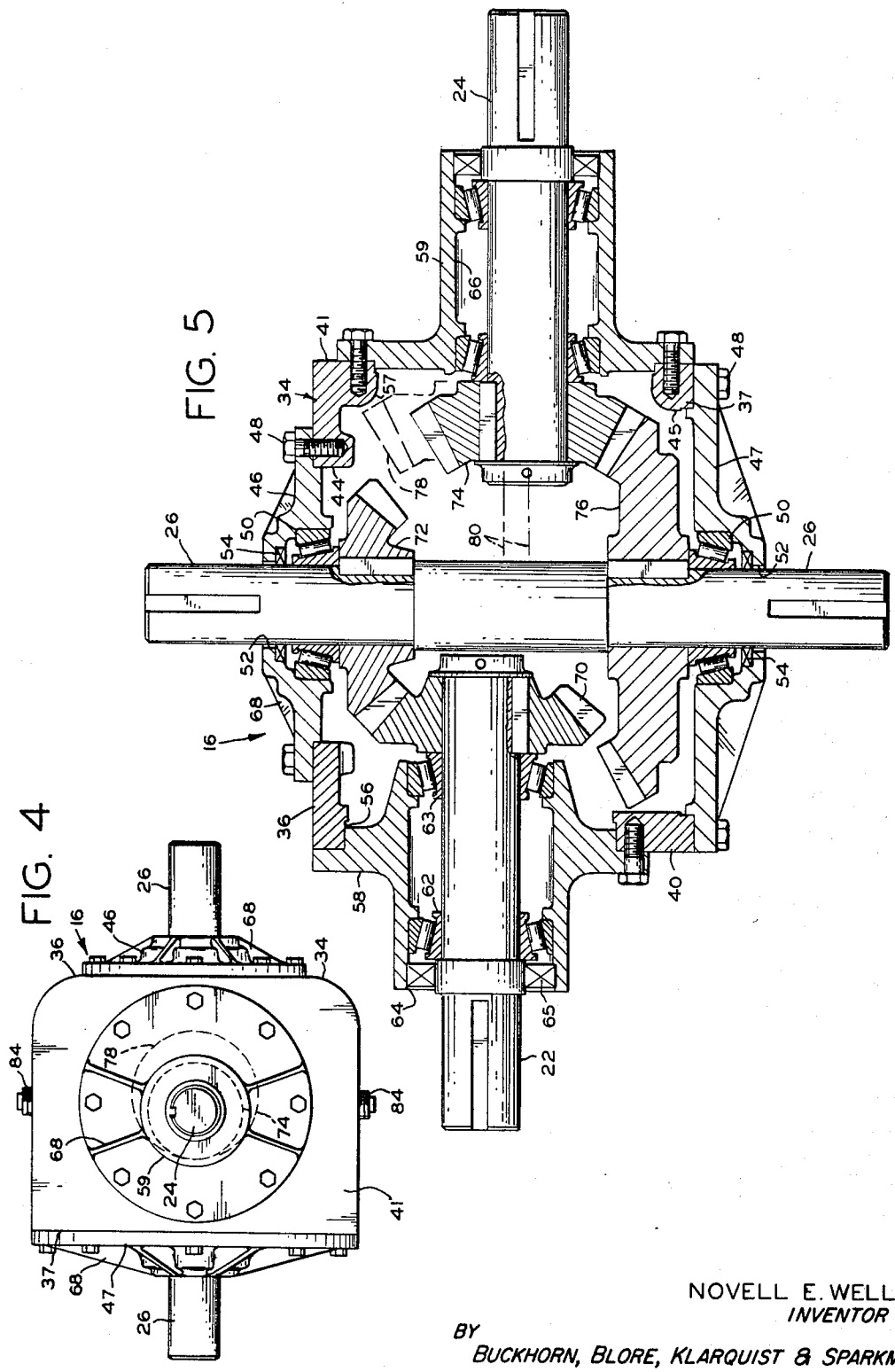

United States Patent Office 3,412,624
Patented Nov. 26, 1968

3,412,624
GEARBOX
Novell E. Wells, 927 Ranch Road,
Boise, Idaho 83702
Filed Aug. 9, 1966, Ser. No. 571,240
13 Claims. (Cl. 74—325)

ABSTRACT OF THE DISCLOSURE

A universal gear box for tractor-driven implements enabling a powered implement to be driven at a constant speed from different tractor-mounted power sources transmitting rotary power at different predetermined speeds. A pair of input shafts of the gear box carry bevel gears which mesh with different bevel gears of an output shaft at different ratios selected so that the output shaft will have a constant rotary speed no matter whether one input shaft is connected to a first power source or the other input shaft is connected to the second power source.

---

The present invention relates to transmissions and more particularly to a gear box for tractor-driven implements.

Formerly, tractors were equipped with power takeoff units designed to transmit rotary power at a constant speed of about 540 revolutions per minute (r.p.m.). Now, however, at least the larger new tractors are being equipped with power takeoff units designed to rotate at higher speeds of 750 or 1,000 r.p.m. Nevertheless, many tractor-driven implements, and especially agricultural implements such as, for example, cultivators, for best results must be operated at a predetermined, constant speed and, specifically, are designed to operate at the slower speeds obtained with the older tractors having low-speed p.t.o. units. Thus, whenever heretofore it has been found necessary or desirable to use a given one of such implements with two or more different tractors with different p.t.o. ratings, it has been necessary to replace the original gear box on the implement designed for use with one of the tractors with a different gear box designed for use with the other tractor, and gear boxes would have to be changed each time the tractors are changed. This is not only an extreme inconvenience to the implement operator, but it also is time-consuming and costly.

The present invention eliminates the above problem and its attendant disadvantages by providing a universal gear box for tractor-driven implements which enables an implement to be used with tractors transmitting rotary power at different speeds and yet which delivers power to the tool of the implement at a constant, predetermined speed of rotation. With the gear box of the present invention, an implement is converted from use with a tractor delivering power at one speed for use with a different tractor delivering power at another speed simply by reversing the gear box end-to-end on its mounting on the implement so that the proper one of its two opposed input shafts can be connected to the power takeoff shaft from the tractor, this being done without changing the orientation of the gear box's single output shaft.

A primary object of the present invention is to provide a gear box to which power can be transmitted at two different speeds and yet which will deliver power in each case at a single constant speed.

Another primary object is to provide a gear box as aforesaid especially adapted for mounting in tractor-driven agricultural implements which enables conversion of the implement for use with tractors delivering power at two different speeds simply by reversing the gear box on its implement mounting.

Another object is to provide a gear box capable of receiving rotary power at two different speeds and delivering power at a single constant speed without changing gears.

Still another object is to provide a gear box capable of receiving power at three or more different rotational speeds and delivering power at a single constant speed of rotation.

A further object is to provide a gear box of an improved simplified and economical construction which is also simple to operate, maintain and convert for use at different input speeds.

The above and other objects and advantages will become more apparent from the following detailed description which proceeds with reference to the accompanying drawings wherein:

FIG. 4 is a right end view of the gear box on a slightly reduced scale taken along the line 4—4 of FIG. 2; and FIG. 5 is a horizontal sectional view on a greatly enlarged scale taken along the line 5—5 of FIG. 2.

Figure 1:
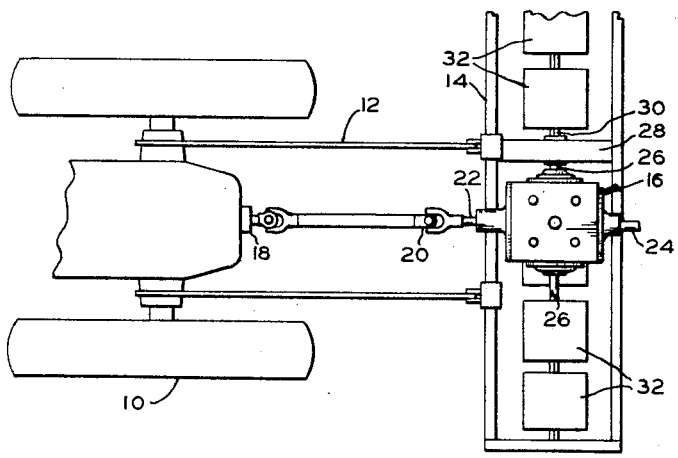
FIG. 1 is a schematic top plan view showing a portion of a tractor and a tractor-drawn and -driven implement including a gear box in accordance with the persent invention.

With reference to the drawings, FIG. 1 shows somewhat schematically a tractor 10 connected by a hitch assembly 12 to a cultivator implement 14 having mounted thereon a gear box 16 which receives power from a power source 18 on the tractor through a rotary power takeoff shaft 20 extending between the tractor and implement. The gear box receives power from the power takeoff shaft 20 through one of two opposed input shafts 22, 24, the connected one of which transmits power to a single output shaft 26, which in turn delivers power through a chain-and-sprocket drive arrangement within a vertical sprocket housing 28 to a cultivator drive shaft 30 on which cultivator wheels 32 are mounted to rotate with the drive shaft.

With reference now especially to FIGS. 2 through 5 the gear box comprises a generally rectangular main housing or casing 34 having opposite sides 36, 37 and opposite ends 40, 41. The opposite sides of the main housing are provided with large openings 44, 45 which are enclosed, respectively, by output shaft bearing housings 46, 47 fastened to the main housing by a series of machine screws 48. Each of the output bearing housings houses a roller bearing assembly 50 which together rotatably mount the single output shaft 26. It will be observed that the output shaft extends completely through the housing and through central openings 52 in the two opposed bearing housings. The bearing housings are provided with grease seals 54 extending between the central openings and the output shaft.

The opposite ends of the main housing are provided with large end openings 56, 57 which are enclosed, respectively, by input shaft bearing housings 58, 59. End bearing housing 58 carries a pair of axially spaced-apart roller bearing assembies 62, 63 which rotatably mount input shaft 22 within a central opening 64 through the housing. A grease seal 65 extends between the central opening and input shaft 22.

The opposite end bearing housing 59 has an opening 66 therethrough which is offset laterally with respect to the center of the bearing housing and with respect to the axis of end opening 57 in the main housing so that the roller bearings carried by the housing rotatably mount input shaft 24 eccentrically with respect to end opening 57 for a reason that will be explained hereinafter. Otherwise the construction of end bearing housing 59 is similar to that of end bearing housing 58. All four bearing housings are reinforced by integral web members 68 which extend between the hub portions and the flange portions of such housings.

A bevel gear 70 is keyed to the inner end of input shaft 22 and meshes with another bevel gear 72 keyed to the output shaft just inwardly of output bearing housing 46. It will be noted that bevel gears 70 and 72 are of the same size so that power transmitted to input shaft 22 by a power takeoff shaft at a given speed of rotation will be transmitted to the output shaft at a one-to-one ratio to cause the output shaft to rotate at the same speed.

The second input shaft 24 has a small bevel gear 74 keyed to its inner end which meshes with a much larger bevel gear 76 keyed to the output shaft just inwardly of output bearing housing 47 on the opposite side of the main housing from gear 72 on the same shaft. Thus power transmitted to input shaft 24 at one speed will be transmitted to the output shaft and cause the output shaft to rotate at a considerably slower speed, depending on the ratio between bevel gears 74 and 76.

For example, the illustrated gear box is intended to receive power from power takeoff shafts rotating at either 540 r.p.m. or 1,000 r.p.m. and deliver power to output shaft 26 in each instance at 540 r.p.m. Thus, when the gear box is used with a power takeoff shaft having a rotational speed of 540 r.p.m., input shaft 22 is connected to such power shaft because its bevel gear and the meshing bevel gear of the output shaft have a one-to-one gear ratio and therefore would cause the output shaft to rotate at 540 r.p.m. also. However, when the gear box is to be used with a power takeoff shaft rotating at 1,000 r.p.m., the housing simply is reversed end-to-end on its implement mounting and input shaft 24 is connected to the p.t.o. shaft. Bevel gear 74 on such input shaft and its cooperative bevel gear 76 on the output shaft have a 1.85-to-1 ratio so that when input shaft 24 is rotated by the p.t.o. shaft at 1,000 r.p.m., the output shaft still rotates at 540 r.p.m.

It will be noted from FIG. 5 that there is a considerable clearance between driven gear 72 and drive gear 74, and similarly there is a clearance between driven gear 76 and drive gear 70 so that the two input shafts operate independently of one another alternatively to drive the output shaft.

The eccentric mounting of input shaft 24 adapts the gear box for use with a power takeoff shaft which rotates at a speed between 540 and 1,000 r.p.m., as for example 750 r.p.m. This is done simply by unfastening end bearing housing 59 from the main housing, replacing the small bevel gear 74 on input shaft 24 with a larger bevel gear 78 as shown in phantom lines in FIG. 5, and then rotating housing 59 one-hundred-eighty degrees and refastening the same to the main housing so as to shift the axis 80 of the input shaft laterally away from output gear 76 to make room for the larger drive gear 78 to mesh with driven gear 76. Even with the large gear 78 on input shaft 24 clearance is provided between such gear and gear 72 on the output shaft. The larger drive gear 78 will, of course, reduce the ratio between such gear and driven gear 76. For example, if it were desired to connect input shaft 24 with a p.t.o. shaft transmitting power at 750 r.p.m., gear 78 would be selected so as to provide a gear ratio of 1.39-to-1 between it and the driven gear. The different sizes of drive gears which eccentric shaft 24 can accommodate are illustrated by hidden lines in FIG. 4.

The outer ends of the input shafts and the opposite ends of the output shaft are provided with keyways for facilitating the connection of such shafts to other power transmitting elements. However, it will be understood that only one of the two input shafts would be connected to power takeoff shaft at any one time.

Figure 2:
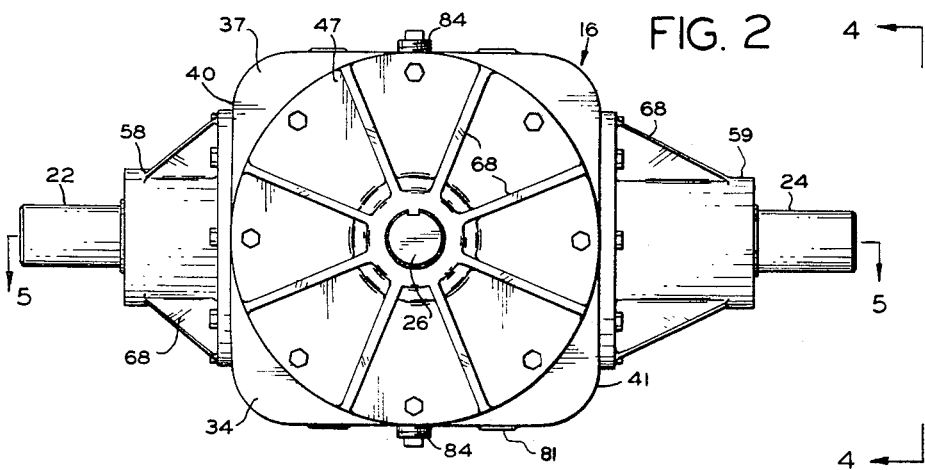
FIG. 2 is an enlarged side elevational view of the gear box of FIG. 1.
Figure 3:
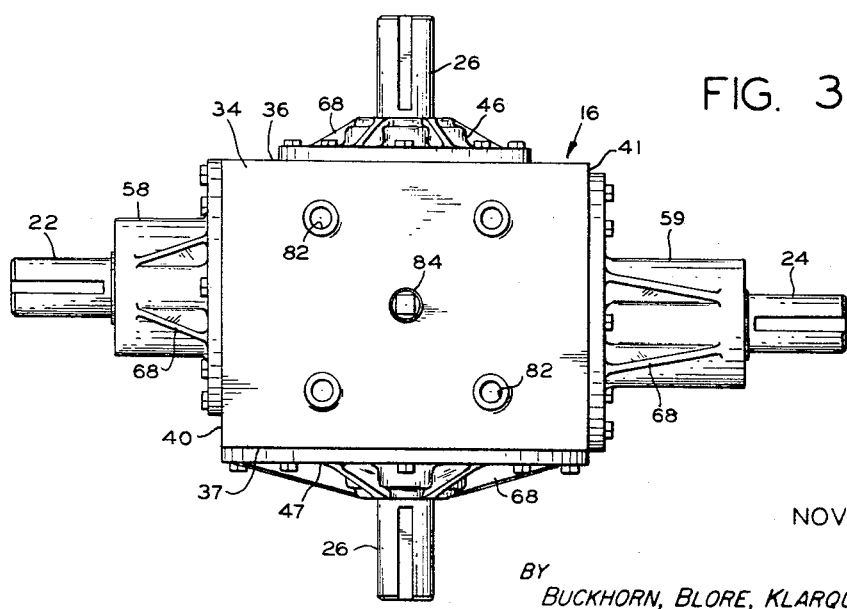
FIG. 3 is a top plan view of the gear box on the same scale as FIG. 2.

From FIGS. 2 and 3 it will be observed that the top surface of main housing 34 is flat and has four symmetrically arranged bosses each containing a threaded opening 82 for fastening the gear box to a mount on the implement by means of threaded fasteners (not shown). A threaded plug 84 closes a central opening in the top surface which permits lubrication access. The bottom surface of the main housing is identical to the top surface in that it also is provided with four symmetrically arranged bosses 81, threaded openings 82, and a plug 84 closing a central opening. With the foregoing arrangement, the gear box can be reversed end-to-end on its mounting in either one of two ways, that is, either by rotating the gear box horizontally 180 degrees so that the original top surface remains on top or by rotating the gear box vertically end-over-end 180 degrees so that the original top surface becomes the bottom surface and vice versa. In either case the output shaft will remain in its original orientation with respect to the implement on which it is mounted and similarly the entire gear box will remain in its same general position on the implement. Moreover, the axes of the two input shafts lie in a common horizontal plane with the axis of the output shaft. The axes of the two input shafts also lie very nearly in the same vertical plane so that upon reversal of the positions of the input shafts very little repositioning of the power takeoff shaft from the connected tractor is required to connect the same to the newly operative input shaft.

Having illustrated and described a preferred embodiment of the invention, it will be apparent to those persons having skill in the art that the same permits of modification in arrangement and detail. I claim as my invention all such modifications as come within the true spirit and scope of the following claims.

I claim:

1. A gear box for mounting on a base structure comprising:

a gear housing, an output shaft means extending into said housing, a pair of input shafts extending into said housing generally transversely of said output shaft means, a first drive gear on one of said input shafts meshed with a first driven gear on said output shaft means, a second drive gear on the other of said input shafts meshed with a second driven gear on said output shaft means and spaced from said first driven gear, the gear ratio between said first drive gear and first driven gear being different than the gear ratio between said second drive gear and second driven gear, said gear ratios being selected so that said output shaft means will be driven at a constant speed when either said first input shaft is connected to rotary power transmitting means rotating at one predetermined speed or alternatively said second input shaft is connected to rotary power transmitting means rotating at a second predetermined speed different from said first predetermined speed.

2. A gear box for mounting on a base structure comprising:

a gear housing, an output shaft means extending into said housing through opposite ends of said housing, a pair of input shafts extending into said housing, first gear means interconnecting one of said input shafts and said output shaft means for transmitting power from said one input shaft to said output shaft means at a first predeterminted ratio, second gear means interconnecting said other input shaft and said output shaft means for transmitting power from said input shaft to said output shaft means at a second predetermined ratio different from said first predetermined ratio, said input shafts being positioned relative to one another so that their positions can be approximately reversed by reorienting said housing without changing the orientation of said output shaft means relative to said base structure and without changing the general positioning of said housing on said base structure, whereby either one of said input shafts can be connected alternatively to a rotary power transmitting means so as to transmit power to said input shaft means.

3. Apparatus according to claim 2 wherein the axes of said input shafts are parallel to one another.

4. Apparatus according to claim 2 wherein the axes of said input shafts are parallel to one another and normal to the axis of said output shaft.

5. Apparatus according to claim 2 wherein said input shafts extend into said housing at opposite sides thereof.

6. Apparatus according to claim 2 wherein the axes of said input shafts are parallel to one another and said shafts extend into said housing at opposite sides thereof in generaly opposed relationship to one another.

7. Apparatus according to claim 2 wherein the axes of said input shafts are parallel to one another and normal to the axis of said output shaft, said input shafts extending into said housing at opposite sides thereof.

8. Apparatus according to claim 2 wherein the axes of said input shafts and the axis of said output shaft all lie in a common plane.

9. Apparatus according to claim 1 wherein at least oen of said input shafts is shiftable laterally away from the associated driven gear on said output shaft so that said input shaft can accommodate drive gears of different sizes whereby to change the power transmitting ratio between said shafts.

10. A gear box comprising:
a main housing member having opposite ends and opposite sides and defining opposed end openings and opposed side openings,
an output shaft extending through said main housing and outwardly thereof through said opposed side openings,
a pair of output shaft bearing housings enclosing said opposed side openings and including bearing means rotatably mounting said output shaft at the opposite sides of said main housing,
a first input shaft extending into said main housing through one of said pair of end openings,
a first input shaft bearing housing enclosing one of said opposed end openings and including bearing means rotatably mounting said first input shaft,
a second input shaft extending into said housing through the other of said opposed end openings,
a second input shaft bearing housing enclosing said other end opening and including bearing means rotatably mounting said second input shaft,
a first drive gear at the inner end of said first input shaft in mesh with a first driven gear on said output shaft,
a second drive gear at the inner end of said second input shaft in mesh with a second driven gear on said output shaft,
the gear ratio between said first input shaft and said output shaft being different than the gear ratio between said second input shaft and said output shaft,
said main housing being reversible endwise so that either one of said input shafts alternatively can be connected to a power transmitting means from an external power source.

11. Apparatus according to claim 10 wherein at least one of said input shafts is mounted in its bearing housing eccentrically with respect to the axis of the associated end opening of the main housing so that upon rotation of said bearing housing within said end opening, said one shaft is caused to shift laterally relative to said output shaft, thereby permitting the interchanging of drive gears of different sizes on said input shaft to mesh with the associated driven gear on said output shaft.

12. Apparatus according to claim 10 wherein one of said driven gears is at one side of said main housing just inwardly of said one output bearing housing and wherein the other said driven gear is at the other side of said main housing just inwardly of said other output bearing housing, each of said driven gears being in mesh with a different one of said drive gears and being spaced from the other one of said drive gears so that each of said input shafts operates independently of the other.

13. A gear box for transmitting rotary power to a driven implement at a constant speed where drive means transmit power to the gear box at different speeds, said gear box comprising:
a gear housing including opposite ends and opposite sides,
an output shaft extending through the opposite sides of said housing,
a first input shaft extending through one end of said housing and toward said output shaft,
a second input shaft extending through the opposite end of said housing and toward said output shaft,
each of said input shafts extending outwardly of said housing and including means for connecting said output shafts to said drive means,
each of said input shafts terminating adjacent said output shaft but on opposite sides thereof,
said input shafts each having a bevel gear mounted adjacent the inner end thereof,
a pair of bevel gears on said output shaft, one adjacent each of the opposite sides of said housing,
one of said bevel gears on the output shaft meshing with the bevel gear on said first input shaft and being spaced from the bevel gear on said second input shaft,
the other bevel gear on said output shaft meshing with the bevel gear on said second input shaft and being spaced from the bevel gear on said first input shaft,
the gear ratio between said first input shaft and said output shaft being different from the gear ratio between said second input shaft and said output shaft and said gear ratios being selected so that when said first input shaft is connected to drive means rotating at one speed, said output shaft will rotate at a predetermined speed and so that when said second input shaft is connected to a drive means rotating at a second speed, said output shaft will rotate at the same said predetermined speed.
said input shafts being positioned so that the ends of said housing can be reversed to connect alternatively one or the other of said input shafts to a drive means without reorienting said output shaft.

References Cited

UNITED STATES PATENTS

| | | | |
|---|---|---|---|
| 2,869,384 | 1/1959 | Scamitter | 74—385 |
| 3,001,409 | 9/1961 | Fumetti | 74—11 |
| 3,002,393 | 10/1961 | Browning | 74—11 |
| 3,015,966 | 1/1962 | Howard | 74—325 |
| 3,059,505 | 10/1962 | Reicks | 74—801 |
| 3,074,285 | 1/1963 | Hausmann | 74—325 |

FOREIGN PATENTS 526,944    7/1927    Germany.

FRED C. MATTERN, JR., *Primary Examiner.*

H. S. LAYTON, *Assistant Examiner.*